Oct. 10, 1961     K. WÜST     3,004,059
PROCESS FOR THE RECOVERY OF ⍵-AMINONITRILES
Filed Feb. 10, 1959
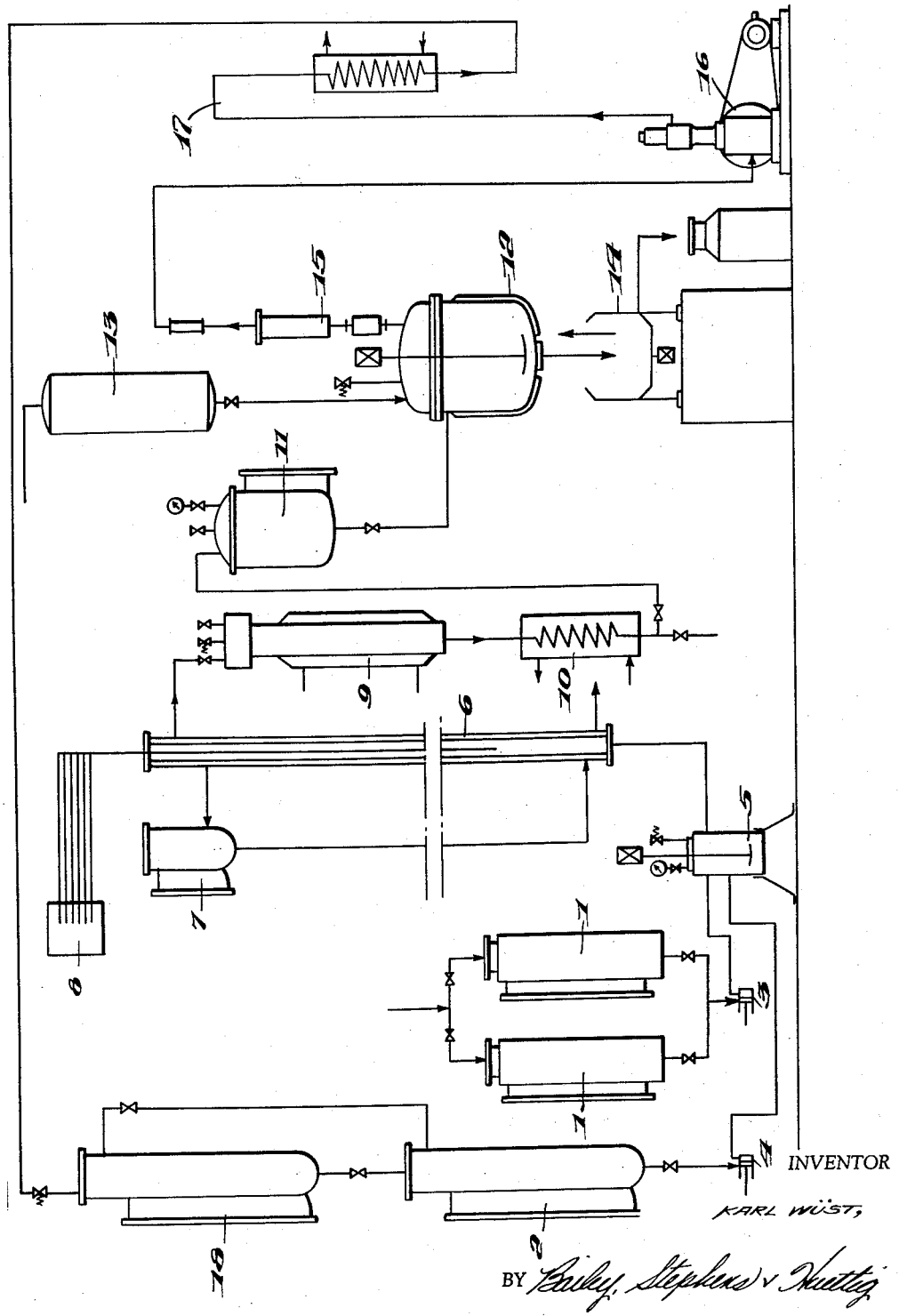
INVENTOR
KARL WÜST,
BY *Bailey, Stephens & Huettig*
ATTORNEYS

United States Patent Office 3,004,059
Patented Oct. 10, 1961

3,004,059
PROCESS FOR THE RECOVERY OF
ω-AMINONITRILES
Karl Wüst, Hanau (Main), Germany, assignor to Deutsche Gold- und Silber-Scheideanstalt vormals Roessler, Frankfurt am Main, Germany
Filed Feb. 10, 1959, Ser. No. 792,431
Claims priority, application Germany Feb. 11, 1958
1 Claim. (Cl. 260—465.5)

The present invention relates to an improved process for the recovery of ω-aminonitriles from their admixtures with ammonium chloride.

It is known that the corresponding ω-aminonitriles can be produced from aliphatic chloronitriles, such as, for example, β-chloropropionitrile, δ-chlorovaleronitrile or ω-chlorooenanthonitrile, by treatment with ammonia at moderate temperatures.

A mixture of ω-aminonitriles with ammonium chloride is obtained in the conversion of chloronitriles with ammonia. This mixture, however, has the tendency of liberating ammonia with the formation of the aminonitrile hydrochloride according to the following equation:

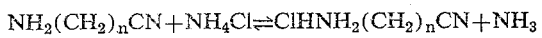

$$NH_2(CH_2)_nCN + NH_4Cl \rightleftharpoons ClHNH_2(CH_2)_nCN + NH_3$$

It is consequently difficult to obtain the aminonitriles in pure form.

According to the invention it was found that ω-aminonitriles containing 3 to 18 carbon atoms can be separated from ammonium chloride in an excellent manner by treating the mixture in the presence of an excess of ammonia with a solvent in which the aminonitrile is soluble but which does not dissolve ammonium chloride. The presence of the free ammonia prevents the formation of the aminonitrile hydrochloride according to the above equation.

The process according to the invention can be carried out in various ways. For example, the solvent can be added to the crude reaction mixture obtained in the production of the aminonitrile under pressure before removal of the ammonia and then releasing the pressure, whereupon the greater part of the ammonia escapes, and then separating the solution from the ammonium chloride by filtering, centrifuging or the like. It is also possible first to release the pressure on the crude reaction mixture, then adding the solvent and separating the resulting solution from the ammonium chloride. Furthermore, it is also possible to introduce the crude liquid reaction mixture under pressure into the solvent.

The solvents which are employed according to the invention, for example, can be aromatic hydrocarbons, such as benzene or toluene or chlorinated hydrocarbons, such as, for example, methylene chloride.

It was found that considerably better yields were obtained when the aminonitriles were dissolved in the solvent in the presence of excess ammonia than when such solution was effected after removal of the excess ammonia from the crude reaction mixture. The presence of the free ammonia evidently prevents formation of the aminonitrile hydrochloride before the aminonitrile is separated from the ammonium hydrochloride. If desired, suitable mixtures of solvents can be employed for the process. A further advantage of the process resides in that contrary to some prior procedures for the recovery of pure aminonitriles it is possible to work in the absence of water. In addition, the process according to the invention can advantageously be carried out continuously.

The accompanying drawing diagrammatically shows an apparatus suitable for carrying out the process according to the invention continuously.

The following examples will serve to illustrate several embodiments of the process according to the invention.

Example 1

84.7 parts by weight of β-chloropropionitrile (80%) were heated together with 1400 parts by volume of liquid ammonia in an autoclave for 1 hour at 63–65° C. while stirring. After cooling to 50° C. whereby the pressure in the autoclave lowers to about 20–30 atmospheres, 300 parts by volume of toluene were pumped into the autoclave under pressure. The pressure was then released from the autoclave and the excess ammonia driven off. The precipitated ammonium chloride was then filtered off and the solution distilled. The toluene was first distilled off at atmospheric pressure and then the reaction product was distilled under vacuum. The yield was 53 parts by weight of pure β-propionitrile which corresponds to 80% of the theoretical.

When this procedure was repeated, except that the toluene was only added after the ammonia had substantially all been driven off, the yield was only 30.9 parts by weight of β-propionitrile which corresponds to 46.6% of the theoretical.

Example 2

124 parts by weight of δ-chlorovaleronitrile (95%) were heated together with 1400 parts by volume of liquid ammonia in an autoclave for 1 hour at 98–101° C. at a pressure of 60–65 atmospheres. After cooling the autoclave, toluene was added under pressure and the δ-aminovaleronitrile recovered as in Example 1. The yield was 77.5 parts by weight of pure δ-aminovaleronitrile corresponding to 78.5% of the theoretical.

On the other hand, when the toluene was only added after the ammonia had been driven off from the reaction product, the yield was only 38.4 parts by weight corresponding to 39% of the theoretical.

Example 3

124 parts by weight of δ-chlorovaleronitrile (95%) were heated with ammonia as in Example 2. The resulting homogeneous reaction mixture was permitted to run under pressure into 300 parts by volume of toluene and δ-aminovaleronitrile was recovered from this mixture as in Example 1. The yield was 73 parts by weight of δ-aminovaleronitrile corresponding to 74% of the theoretical.

Example 4

145.6 parts by weight of ω-chlorooenanthonitrile (95%) were heated with 1700 parts by volume of liquid ammonia at 99–103° C. for one hour and thereupon at 68° C. for a further 90 minutes. Upon addition of 300 parts by volume of toluene and recovery of the ω-aminooenanthonitrile as in Example 1, 103.6 parts by weight of the product were recovered corresponding to 86.5% of the theoretical.

Example 5

145.6 parts by weight of ω-chlorooenanthonitrile (95%) were heated together with 1700 parts by volume of liquid ammonia in an autoclave for 45 minutes at 99–103° C. During such heating the pressure rose to 121 to 168 atmospheres. The reaction mixture was cooled to 50° C. and then 360 parts by volume of toluene were pumped in. 99.3 parts by weight of ω-aminooenanthonitrile were recovered from this mixture as in Example 1. This corresponds to 83.1% of the theoretical.

When the procedure was repeated, except that the toluene was only added after the ammonia had been driven off, the yield was only 60.7% of the theoretical.

Example 6

145.6 parts by weight of ω-chlorooenanthonitrile (95%)

were heated together with 1430 parts by volume of liquid ammonia in an autoclave for 1 hour at 98–100° C. During such heating the pressure rose to 60–63 atmospheres. After the reaction mixture had cooled to 50° C., 300 parts by volume of methylene chloride were pumped in. After driving off the ammonia and filtering off the ammonium chloride, 91.0 parts by weight of ω-aminooenanthonitrile corresponding to 76% of the theoretical were recovered from the solution.

*Example 7*

139 parts by weight of ω-chloropelargonic acid nitrile were heated together with 1400 parts by volume of liquid ammonia for 1 hour at 109–110° C. During such heating the pressure rose to 70–78 atmospheres. After the reaction mixture had cooled to 50° C., 300 parts by volume of toluene were pumped in under pressure. Pure ω-aminopelargonic acid nitrile was recovered from such mixture as in Example 1. The yield was 77.3% of the theoretical.

The following two examples illustrate continuous operation of the process according to the invention employing the apparatus illustrated in the drawing.

*Example 8*

0.6 part by volume and 5.0 parts by volume of liquid ammonia were pumped per hour from storage containers 1 and 2 with the aid of metering pumps 3 and 4 through a mixing vessel 5 provided with a magnetic stirrer and then through a reaction tube 6 which was 5 meters long and had an interior diameter of 46 mm. A reaction temperature of 100° C. was maintained within tube 6 with the aid of hot water cycle 7. The temperature was controlled by contact thermometer 8. The reaction pressure amounted to about 80 atmospheres gauge pressure. The reaction solution was passed to pressure separator 9 which also was heated to 100° C. and continuously blown off over cooler 10 into container 11 maintained at a lower pressure and at about room temperature. From time to time 36 parts by volume of the reaction solution were withdrawn from container 11 and supplied to a heatable mixer 12 which contained 20 parts by volume of toluene which was supplied from storage container 13. Heat was supplied to mixer 12 and the ammonia driven off at about room temperature. The reaction solution, which was then to a far extent free of ammonia and contained precipitated ammonium chloride, was separated from the ammonium chloride in centrifuge 14. (The centrifuged ammonium chloride being washed with 5 parts by volume of toluene.) The ammonia which was driven off in mixer 12 was passed over toluene separator 15, compressed by compressor 16 and returned after cooling in cooler 17 to the ammonia storage vessel 18. The ammonium chloride free toluene containing reaction solution leaving the centrifuge was subjected to vacuum distillation after removal of the toluene. 21.23 parts by weight of ω-aminooenanthonitrile were produced from 20.3 parts by weight of ω-chlorooenanthonitrile, $Cl(CH_2)_6CN$, corresponding to a yield of 81% of the theoretical. The residue from the vacuum distillation amounted to 5.15 parts by weight and the ammonium chloride produced amounted to 11.20 parts by weight.

*Example 9*

Analogous to Example 8 and using the same apparatus, 0.6 parts by volume per hour of ω-chloropelargonic nitrile were reacted with 5.07 parts by volume of liquid ammonia at 104–108° C. and a gauge pressure of 89 to 94 atmospheres and the resulting ammonium chloride separated analogously to Example 8.

35.67 parts by weight of ω-aminopelargonicnitrile were produced from 45.1 parts by weight of ω-chloropelargonicnitrile which amounted to a yield of 89% of the theoretical. The residue from the vacuum distillation amount to 5.7 parts by weight and the ammonium chloride produced amounted to 13.3 parts by weight.

*Example 10*

A ω-chloronitrile fraction which was freed of chloronitriles containing less than 11 carbon atoms by distillation and from which higher chloronitriles and residues were removed by distillation over a mixed film column to provide a ω-chloronitrile mixture (95%) containing an average of 15 carbon atoms (determined by the chlorine content).

127 parts by weight of such ω-chloronitrile mixture and 850 parts by weight of liquid ammonia were heated for 2.5 hours in an autoclave at 103–105° C. and a gauge pressure of 64–67 atmospheres. After a portion of the ammonia had been blown off, 305 parts by weight of toluene were added, the remaining ammonia driven off and the precipitated ammonium chloride (23.5 parts by weight) filtered off. The toluene was then driven off and the ω-aminonitrile mixture distilled under vacuum. 91.0 parts by weight of a ω-aminonitrile mixture having a boiling point between 122° C. at 0.5 mm. Hg and 170° C. at 0.2 mm. Hg corresponding to an 82% yield based on ω-aminopentadecylenenitrile were obtained. The residue from the vacuum distillation amounted to 24.9 parts by weight.

*Example 11*

A ω-chloronitrile fraction which was freed of $C_3$–$C_9$ chloronitriles by distillation and from which higher chloronitriles and residue were removed by distillation as in Example 10 to provide a ω-chloronitrile mixture (95%) containing an average of 18 carbon atoms.

153.7 parts by weight of such ω-chloronitrile mixture and 850 parts by weight of liquid ammonia were heated for 2.5 hours in an autoclave at 103–105° C. and a gauge pressure of 65–68 atmospheres. After a portion of the ammonia had been blown off 520 parts by weight of toluene were added, the remaining ammonia driven off and the precipitated ammonium chloride filtered off and extracted several times with toluene to remove the more difficultly soluble higher ω-aminonitrile fractions. The toluene was then driven off and the ω-aminonitrile fraction distilled under vacuum. 90 parts by weight of a ω-aminonitrile mixture having a boiling point between 132° C. at 0.4 mm. Hg and 209° C. at 0.35 mm. Hg corresponding to an 82% yield based on aminooctadecylenenitrile and chlorooctadecylenenitrile were obtained. The residue from the vacuum distillation amounted to 44.9 parts by weight.

*Example 12*

145.6 parts by weight of ω-chlorooenanthonitrile (95%) and 870 parts by weight of liquid ammonia were heated in an autoclave for 1 hour at 98–102° C. and a gauge pressure of 60–63 atmospheres. After a portion of the ammonia had been blown off, 400 parts by weight of methylene chloride were pumped in, the remainder of the ammonia driven off and the precipitated ammonium chloride filtered off. The methylene chloride was then driven off and the ω-aminooenanthonitrile distilled under vacuum. 91.0 parts by weight of ω-aminooenanthonitrile corresponding to a yield of 76% of the theoretical were obtained. The residue from the distillation amounted to 37.4 parts by weight.

*Example 13*

145.6 parts by weight of ω-chlorooenanthonitrile (95%) and 1040 parts by weight of liquid ammonia were heated in an autoclave for 30 minutes at 97–104° C. and a gauge pressure of 90–140 atmospheres. After a portion of the ammonia had been blown off, 266 parts by weight of benzene was pumped in, the remainder of the ammonia driven off and the precipitated ammonium chloride (44.5 parts by weight) filtered off. The benbene was then driven off and the ω-aminooenanthonitrile distilled under vacuum. 94.9 parts by weight of ω-aminooenanthonitrile corresponding to a yield of 97.3% of the theoretical were obtained. The residue from the distillation amounted to 24.9 parts by weight.

The minimum quantity of ammonia which should be present in the reaction mixture when the solvent is added is from about 0.5 to about 1.0% related upon the weight of the ω-aminonitrile. The best results are obtained when the ammonia is present in a concentration which corresponds to the solubility at room temperature of ammonia in the mixture of the used ω-aminonitrile and ammonium chloride.

I claim:

A process for separating a saturated straight chained ω-aminonitrile containing 3 to 18 carbon atoms from its admixture with ammonium chloride which comprises adding in the presence of free amomnia an organic solvent selected from the group consisting of benzene, toluene and methylene chloride to such mixture to dissolve the ω-aminonitrile the quantity of free ammonia present in the admixture to which the solvent is added substantially corresponding to the solubility of the ammonia in the admixture at room temperature, driving off the free ammonia and separating the ω-aminonitrile solution from the precipitated ammonium chloride.

References Cited in the file of this patent

UNITED STATES PATENTS

| 2,443,292 | Bauer et al. | June 15, 1948 |
| 2,459,420 | Erickson | Jan. 18, 1949 |